June 24, 1930.  W. B. WESCOTT  1,768,348
COMPOSITE RUBBER ARTICLE OF GRADED PROPERTIES AND METHOD OF MAKING THE SAME
Filed Dec. 27, 1927  2 Sheets-Sheet 1

Inventor
William B. Wescott

By K. P. McElroy
Attorney

Inventor
William B. Wescott
By K. P. McElroy
Attorney

Patented June 24, 1930

1,768,348

UNITED STATES PATENT OFFICE

WILLIAM BURTON WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

COMPOSITE RUBBER ARTICLE OF GRADED PROPERTIES AND METHOD OF MAKING THE SAME

Application filed December 27, 1927. Serial No. 242,648.

This invention relates to composite rubber articles of graded properties and to methods of making the same; and it comprises a composite body of rubber and fiber; useful in making axle bumpers, solid tires, tractor pads, or the like; the rubber being present usually partly as old vulcanized rubber, such as that obtained from old tires, and partly as new bonding rubber, advantageously derived in situ from liquid latex; the fiber being present usually as short lengths of twisted cords, such as may be obtained by shredding old tire fabric; the rubber having a maximum concentration in one portion of said body, usually a load receiving surface, and a minimum concentration in a remote portion of the body wherein the fiber concentration is a maximum, usually the base or supporting surface; the intermediate portions of the body being composed of merging zones or regions of variable rubber composition or rubber and fiber ratios which impart a gradual change to the physical properties of the body, whereby the body as a whole has the properties of a normal resilient rubber article adjacent one surface, and the strength and strain-resisting properties of a rigid structure adjacent an opposed surface; all as more fully hereinafter set forth and as claimed.

There are many requirements in the arts which could be satisfied by a durable article having a highly resilient wear-receiving surface, and a base having a strong resistance to shear and compressive loads.

The conditions experienced when an article of rubber is subjected to strains are peculiar to the material. Any rigid body, such as a concrete pedestal may be strengthened at any desired point simply by locally increasing its dimensions. But this cannot be done with rubber. When an attempt is made to strengthen rubber articles by increasing the size, or by varying the composition in such manner as to impart a local increased strength, it is found that the ordinary theories of rigid structures do not fully agree with the observed results. The failure of such theories may be attributed in part to the peculiar reactions of rubber when it is subjected to strains developed either by compressive loads or shearing stresses.

Under a compressive force, a body of rubber tends to deform at right angles to the line of application of the load, rather than along lines parallel thereto. This effect is due to the fact that rubber, (meaning not only caoutchouc but rubber compounds containing caoutchouc and various fillers), is substantially incompressible. Under compressive loads, deformation does not follow Hooke's law. One result of this lateral deformation, which is more in the nature of a displacement of rubber than of a true compression, is to set up within the body a number of shearing stresses acting at an angle to the base of the body, and usually exhibiting their deleterious effects by developing cracks extending from the base of the article inwardly and upwardly toward the top. These strain cracks are more pronounced in the case of articles receiving vibratory impacts, such as rear axle bumpers for automobiles, or solid tires for motor vehicles. The ultimate effect of such failures may be to cause a practical destruction of the artcle long before the wear-receiving surface has been destroyed.

Another effect dependent upon the physical peculiarities of rubber resides in the reactions under load occurring between the base of the rubber article and the foundation upon which it is supported where the foundation is rigid; as for example with rubber paving blocks and automobile axle bumpers. A rubber paving block has long been wanted, but has proved impractical in general because of separation of the resilient rubber from the firm and unyielding foundation of the roadway. Likewise with an automobile axle bumper secured to a steel frame, separation of the resilient rubber from the unyielding base can be traced directly to the fact that, under compression, the rubber is displaced and the foundation is compressed. The resulting shearing stresses act to pull the rubber from the base, thus causing premature failure.

In the manufacture of rubber articles according to the present invention, that is, articles adapted to be secured to rigid bases, there are two primary criteria to be considered. The first is that the composition shall be free from zones which induce a concentration of destructive shearing forces, and the second is that the base or supporting surface of the article shall partake more of the characteristics of a rigid body than of a resilient and non-compressive body such as rubber. To satisfy service demands, the load receiving portions of the article must have the characteristics of rubber, but in approaching the base or supporting zones of the article the characteristics must change to those of a rigid body. The load receiving surface must be deformable, the base compressible, and the intermediate portions must gradually change in properties.

These criteria are complied with in the present invention by altering the composition of the article from one giving high resiliency, maximum deformation, and negligible compressibility at the wear receiving surface, to one giving low extensibility and maximum true compressibility at the supporting surface. In other words, the peculiar rubber characteristics are at a maximum at one surface and at a minimum at another. Such articles may be formed from a composite body of rubber and fiber, wherein the fiber concentration is a maximum adjacent the base but practically negligible adjacent the wear receiving surface. The resiliency of such articles is a variable from the top to the bottom, but the changes occur in such imperceptible degrees that there is no zone wherein the shearing stresses may be concentrated to cause premature failure.

As typifying the principles and advantages of the invention, reference may be made to a solid tire, an automobile axle bumper, and a machine supporting block, illustrated in the accompanying drawing, wherein—

Figure 4:
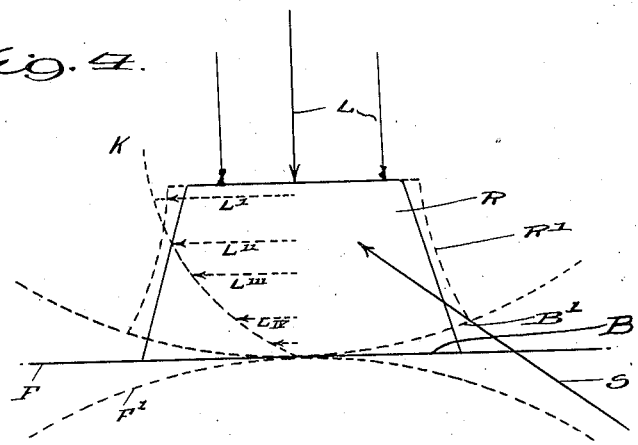
Fig. 4 is a diagram indicating the reaction of forces imposed upon a body of rubber; and, Fig. 5 is a diagram indicating the reaction of forces imposed upon an article made in accordance with this invention.

As indicated in Fig. 4, when a load L is applied to a body of rubber or rubber composition R, supported upon a rigid base or foundation F, there is developed within the body R a plurality of lateral stresses, $L'$, $L''$, $L'''$, etc., which tend to deform the body R in a lateral direction with respect to the base F, tending to give the body R a shape such as that indicated by the dotted lines $R'$. The downwardly acting force L, however, exerts a normal compressive effect upon the foundation, causing it to tend to assume the shape indicated by the dotted line $F'$. The strains set up within the body R by the laterally directed stresses $L'$, etc., pull the base B of the body R upwardly, as indicated by the dotted line $B'$. The arc $F'$ and $B'$ are divergent, and the body R, taken as a whole, tends to separate or break away from the base. It will be noted that the line K, indicating the envelope of the several forces $L'$, etc., in various planes, is generally parallel to the arrow S, which represents the usual direction of the cracks that are developed by the shearing forces.

Figure 5:
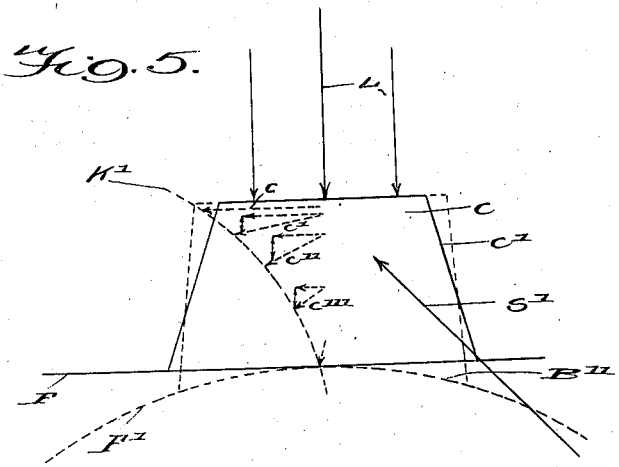

Fig. 5 represents the ideal conditions which should exist in a body having rubber properties, in so far as resiliency or cushioning are concerned, but which is capable of maintaining a firm anchorage on a rigid base and wearing without the development of shear cracks. As in the case of a unitary rubber body R, a centrally applied load L, applied to the ideal body C, should cause a lateral displacement of the rubber composition adjacent the load receiving surface, but the base should deform along the arc $B''$, thus following the compressive deformation of the foundation $F'$. To effect this result, the several components $c$, $c'$, $c''$, etc., of the load L, should be progressively rotated, so that the lines of action are turned through angles, giving shorter lateral components and longer vertical components as they approach the base. In the ideal body, the upper component $c$ may be at right angles to the load, but the lower component should be substantially parallel to the line of action of the load. Intermediate components should assume various angles, changing by gradual degrees from a position parallel to the base to one perpendicular to it. In a composite body of this nature, the deformed shape $C'$ is so stressed that the resultants of the lateral and vertical loads neutralize the shearing load $S'$, which would otherwise cause premature failure by cracking. The body shown in Fig. 5 possesses the properties of rubber adjacent one surface and the properties of a rigid body adjacent another surface, while the intermediate properties are such as to overcome the tendencies of shearing and separation.

In practice, the above discussed requirements are met by making a composite body of rubber and fiber, wherein the amount of fiber at the base of the body is relatively high, there being just enough rubber to bond the fibers, and the amount of rubber at the top of the body is far in excess of the amount of fiber. Intermediate the two zones of maximum rubber and maximum fiber concentration, the ratio of rubber to fiber gradually decreases. In such composite bodies, the upper zone behaves like ordinary rubber, whereas the lower zone, being composed mainly of fiber, responds to compressive forces in a manner quite similar to any rigid body. Of course, for practical purposes, the transition from regions of high rubber concentration to high fiber concentration need not follow a minutely smooth course; thus, the body my be made with three or four merging layers composed of various proportions of rubber and fiber. During the operations incidental to shaping and vulcanizing however, the boundaries between the zones become indistinct, and the zones merge so that the gradation of ratios may become quite regular.

Either a solution of rubber in benzol or fluid latex may be employed for bonding, but the latter is much better. A more uniform distribution may be effected with latex, and the fibers impregnated to an extent better enabling them to resist destructive strains. The shaping operations are also facilitated when latex is used. In addition to this bonding or "new" rubber, varying quantities of old rubber, may be included, that is to say, granules of vulcanized rubber such as are obtained from old pneumatic tire scrap. These granules may vary from the size of a pea to fine dust, and serve to facilitate the control of the resiliency of the finished article in which they are included.

The fiber is also advantageously derived from old tires by shredding or cutting the cords composing the fabric into short random lengths, say from 0.25 to 1.5 inches. Of course, there will be obtained, by any ordinary shredding operation, shorter and longer lengths, but these also may be utilized. Tire scrap is a good source of raw material, for it is cheap, and it may readily be shredded and screened to provide portions of different sizes and rubber-fiber ratios. It will be understood that other materials than old tires may be used, but usually they are not as practically desirable.

The shaping and vulcanizing of the composite body is readily accomplished. Into a suitable mold may be placed a layer of cords of long length, thoroughly admixed with fluid latex or rubber cement. Upon this layer is placed a second layer of shorter cords, old rubber particles, and more latex, and the body is then built up until the top portion is reached, which may be composed entirely of a good grade of rubber. The built up composite article is then dried, compressed to desired size (an operation which causes a sufficient migration of cords and rubber from one zone to another to obliterate distinct boundaries), and vulcanized in accordance with the customary practices of the rubber industry.

Figure 1:
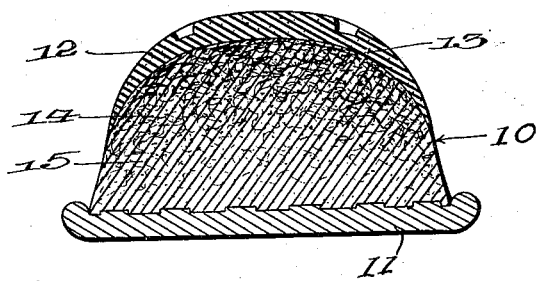
Fig. 1 is a transverse cross-sectional view of a solid tire.

The solid tire illustrated in Fig. 1 is composed of a composite body 10 vulcanized upon a metallic base band 11. The tread portion 12 of the tire is composed of a good grade of tread stock, which possesses the deforming properties of rubber and is substantially incompressible. Beneath the tread 12 and within the body of the tire is a layer of rubber 13 containing a limited amount of fibers disposed in a lateral direction. When so disposed, these fibers act to a certain extent like a breaker strip in a pneumatic tire. They have another function in this tire, as, when the tread is worn away, the fibrous surface exposed may be buffed to provide a firm anchorage for a new tread, which may be readily vulcanized in place.

Beneath the layer of fibers 13 is a body 14, composed of old rubber scrap containing but little, if any, cord or fiber. Generally the outer half or two thirds of the tire body 10 is substantially free from fiber, except to the extent indicated. This body of old rubber granules is bonded with latex rubber, and serves to alter the resiliency of the tire in this zone. Ordinarily, the concentration of old rubber gradually diminishes inwardly toward the base band, but it will be understood that the exact proportions employed will depend upon the specific properties desired in the tire.

The fiber occurs in a maximum concentration adjacent the base band, as indicated by the zone 15. This portion of the tire is composed essentially of fibers, bonded by a minimum quantity of rubber, and containing practically no old rubber granules. To preserve the gradation, the fibers decrease in concentration outwardly so that there is no well defined line indicating the transition from the region of high fiber concentration to the region of high rubber concentration. Short lengths of old tire fabric may well be utilized for the base composition, and, after bonding, they yield a body which is but slightly extensible but which deforms under compressive loads substantially in accordance with Hooke's law. The bonding rubber imparts to the base a desirable elasticity, but the base behaves as a rigid body, rather than as a non-compressible body.

If desired, a plurality of circumferentially disposed wires may be placed in the zone 15 to maintain the rigidity of the structure, and the base band 11 may be eliminated.

In making the tire, the various composite materials are mixed in the desired proportions with fluid latex, which may be of normal consistency, thickened, diluted, or concentrated, as expediency dictates. It is better to include an anti-coagulant in the latex, such as a few per cent of ammonia, in order to obtain the bonding rubber in the form of a gel, rather than as a coagulum which has inferior vulcanizing properties. Hemoglobin, or the "red end" of blood, which is an excellent preservative for latex, may also be used, either alone or in the form of its reaction product with zinc oxid if a thickened latex or dry molding are desired. Hard rubber or old rubber particles exert a coagulating effect on fluid latex, and since the formation of a coagulum interferes with the penetrating powers of normal latex, the use of suitable preservatives is again indicated. If, for special reasons, coagulated latex is desired, it may readily be obtained by using less or no preservative, adding an acid coagulant such as acetic acid, adding solid compounds capable of producing coagulation, subjecting the mixture of latex and rubber or fiber to violent mechanical action, heating, or like expedients.

Having formed batches of fiber and latex containing various proportions and varying amounts of old rubber particles, the wet masses may be superimposed in a long perforated trough having the general transverse configuration of a solid tire section or may be separately dried, shredded, and subsequently mixed. Vulcanizing agents and fillers may also be included. A stock mix containing mostly fiber is first laid into the proper depth, wires being inserted if desired. Upon this layer is positioned the remaining layers of stock, the fiber concentration decreasing, and the rubber concentration increasing, progressively outwardly. When the stocks is roughly shaped, it is dried at a temperature of about 140° to 160° F., either in an atmosphere of conditioned air or under vacuum. The drying operation removes the water of the latex, leaving the gelled rubber as a bonding film which permeates the fibers and old rubber particles. It is advantageous to dry the material until it contains a sub-normal moisture content, that is, less than moisture of condition, and at a temperature below the coagulating point of the protective anti-coagulant. When hemoglobin is used, this method of drying greatly increases the bonding properties of the material.

When dry, the tire stock is rather porous, and it is then subjected to an initial compression to reduce the volume to the size required. Compression may advantageously be effected with pressures of from one to three tons per square inch, with a reduction in depth of the stock of about 50 per cent. This operation welds the gelled rubber surface together, and causes some translocation of rubber and of fiber into adjacent zones, thereby eliminating sharply defined boundaries or regions favorable to concentration of shearing stresses.

After compression, the stock may be cut into appropriate lengths, the ends skived and lapped, wrapped around a circular mandrel, and then the tread stock 12 applied in the usual manner, the cross-laid fibers 13 providing a good anchorage therefor.

Into each batch may be incorporated, prior to molding, desired fillers and vulcanizing agents. When the tire is to be vulcanized upon a metallic base band, it is advantageous to include an excess of sulfur in the base stock material 15, in order that the bonding rubber shall cure hard and adhere to the metal. Ordinary quantities of sulfur are better in the regions wherein old rubber predominates, as the old rubber itself may be relied upon to impart the desired degree of resiliency and hardness.

The tire is vulcanized in accordance with the customary practice of the rubber industry, being disposed in a mold and subjected to heat and pressure until vulcanization is effected.

A tire of this character partakes of the properties of an ordinary rubber tire in that region where such properties are desirable, namely, adjacent the tread surface or load receiving portion. The base portion, however, being composed essentially of cord, reacts to compressive loads like an ordinary rigid body, the deformation being in the nature of a true compression rather than a displacement. The intermediate regions have mixed properties, but the variations are such as to prevent the concentration of shearing stresses which would cause premature failure. While the body is initially composed of regions rather well defined as to their rubber-fiber ratios, the various steps of the process obliterate these boundaries, and there are no sharp lines of division. Of course, mathematical analysis of the change in properties will indicate that, in certain portions, the rate of change is more abrupt than in others. However, for most purposes, mathematical exactness is not required; it is merely necessary to avoid sharp changes such as occur in ordinary laminated structures.

For some purposes, the body may be made by shredding old tire scrap to obtain fibers of various lengths and rubber particles of different sizes. The fibers may be separated, admixed with latex, and placed in the bottom of the mold. Then the mass of old rubber particles from which the fibers were separated, is mixed with latex, and this mixture poured on top of the fibers. This operation forms two layers in the mold. In order to eliminate the line of demarcation between the two layers, the upper layer which is the rubber containing portion of the latex may be stirred causing the rubber particles to arrange themselves according to size, the larger particles being concentrated at the bottom near the fibers, and the smaller particles being near the top and causing some of the fibers of the bottom layer to distribute themselves throughout the lower part of the upper layer. If a more general variation of the ratio of fiber and rubber content is desired the entire mass of latex fibers and rubber in the mold may be gently stirred, the longer fibers settling to the bottom of the mold and matting closely together, the shorter fibers and the larger rubber particles gradually commingling to form a series of blending zones of varying fiber and rubber content. This operation produces a body of rubber and fiber in which there are no sharp lines of division between the lengths of the fibers or between the sizes of the rubber particles. It will be noted that this operation provides a batch having a maximum fiber concentration at one zone and a maximum rubber concentration at a remote zone. The stirring operation is merely to eliminate sharp lines between the various zones. It will be seen that this simple method may be employed to advantage in practicing the invention, giving an excellent and uniform variation in properties.

Figure 2:
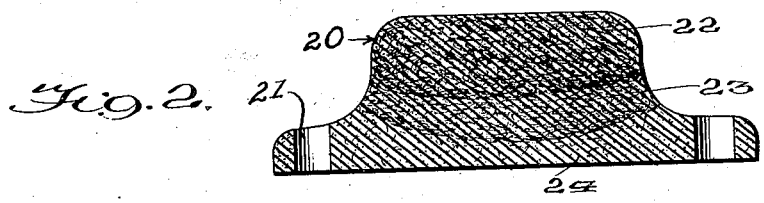
Fig. 2 is a transverse cross-sectional view of a rear axle bumper for a motor vehicle.

The block 20 shown in Fig. 2 is useful as a bumper or cushion interposed between an automobile rear axle and the car body. Such bumpers should have a high surface resiliency; must locally partake of the properties of rubber. The base of the bumper, however, is affixed to a rigid body, and hence mere hardening of the rubber in the base will not overcome the tendency to shear at the bolt holes 21 now observed in ordinary bumpers. As I have shown in the illustration, a suitable bumper may be formed from a plurality of merging layers or zones of rubber and fiber, 22, 23, and 24. For a specific composition, I have employed with success the following proportions:

|  |  | Per cent |
|---|---|---|
| Outer cushion 22 | Rubber dust | 70.0 |
|  | Short fiber | 17.5 |
|  | Latex rubber | 12.5 |
| Transition zone 23 | Rubber Dust | 43.0 |
|  | Long fiber | 43.0 |
|  | Latex rubber | 14.0 |
| Base zone 24 | Long fiber | 87.5 |
|  | Latex rubber | 12.5 |

The molding operation is effected in a manner similar to that described in connection with the solid tire 10, suitable quantities of sulfur and accelerators being included in the latex mixture. The outer zone is composed mostly of rubber providing a resilient cushion, reinforced somewhat by a limited amount of fiber, and bonded by the latex rubber. The mid-zone 23 contains initially about equal proportions of rubber and fiber, which here occur in the form of pieces of tire cord. Only enough rubber is used in the base zone to bond the fibers or cords, thereby giving the base more the cord characteristics than rubber characteristics; i. e. response to shocks is by compression rather than deformation. In the course of manufacture, the boundaries of the zones become sufficiently indistinct to give the gradual change of properties contemplated.

Figure 3:
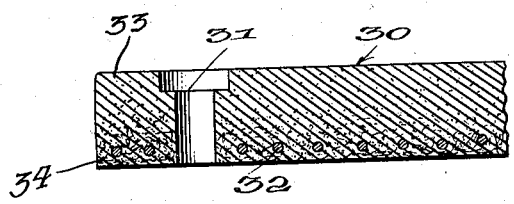
Fig. 3 is a cross-sectional view of a machine supporting block.

The article shown in Fig. 3 is adapted to support heavy vibrating machinery, such as a beam punch. In this type of service, the rolling loads encountered with tires or pads, and the shock loads experienced in automobile bumpers, are not present to the same extent. The load imposed by such machines is variable, having a sharply defined maximum which develops high lateral loads and vibrations. In the illustration, the support is indicated as a whole by the reference numeral 30 and the bolt holes by the numeral 31. A wire screen or netting 32 is disposed in the lower portion of the support, being secured by the rubber bond, and also by the interlinkage of the lengths of cords, which, during molding, twist about the strands of wire and about each other to provide an anchored structure. In a support of this character, the upper surface 33 is rich in old rubber, while the lower surface 34 is rich in cords. The intermediate portions contain progressively varying percentages of cords and rubber.

There are many other uses for a composition of this character, such as rubber shaft bearings, scouring rollers, chute liners, tube mill liners, or the like, wherein a deformable surface layer and a compressible base layer are desirable. Such specific uses however, need not be further described to explain the invention. It will be seen that by progressively grading the properties of a rubber fiber composition from those of non-compressible but extensible rubber, to those of a compressible but slightly extensible body, in a substantially uniform manner, the desirable features which indicate the use of rubber are retained, but the undesirable features of base separation and internal splitting due to shear are eliminated. This transition of properties cannot be attained by mere local reinforcement, lamination, or variation of the sulfur content. These expedients may be employed in connection with the present invention, but they do not form the essence of it.

It will be further understood that articles contemplated by the present invention may be formed either by wet or dry molding processes, or by using specially prepared latices, such specially prepared latices being used to modify the characteristics of the final article to meet special conditions of service. Likewise, for special purposes, such fillers as abrasive grains or asbestos may be added.

What I claim is:
1. As an article of manufacture, a composite body of rubber and short lengths of cord disposed therein in random arrangement, the rubber being composed in part of old vulcanized rubber and in part of new bonding rubber, the concentration of old rubber and of cords varying throughout the extent of the body.

2. As an article of manufacture, a composite body of rubber and short lengths of twisted cords, the rubber being composed in part of granules of old vulcanized rubber and in part of new bonding rubber, the concentration of the cords being gradually diminished from one portion of the body to another and the concentration of old vulcanized rubber being gradually increased from a minimum in the region of high cord concentration to a maximum in the region of low cord concentration.

3. As an article of manufacture, a shaped and vulcanized composite body of rubber and cords, the cords being disposed in random arrangement and bonded by the rubber, the ratio of rubber to cords decreasing from one extreme portion of the body to an opposed extreme portion by degrees, whereby the resiliency of the body will be a maximum in the portion of high rubber concentration and a minimum in the portion of low rubber concentration, the transition from regions of high resiliency to regions of low resiliency being gradual.

4. As an article of manufacture, a composite body as defined in claim 1, wherein the bonding rubber is derived in situ from fluid latex.

5. In the manufacture of composite articles having a region of low compressibility and high resiliency and a region of low resiliency and high compressibility, the process which comprises preparing a number of mixtures of rubber and fiber, in each of which the ratio of rubber to fiber is different, and forming the article from such mixtures by disposing in the region of low resiliency and high compressibility that mixture containing the most fiber, disposing in the region of low compressibility and high resiliency that mixture containing the least fiber and most rubber, and disposing intermediate the two stated regions those mixtures containing different ratios of rubber and fiber in such relation that the transition from the region of low compressibility and high resiliency to the region of high compressibility and low resiliency is effected by a gradual change of the rubber and fiber ratio, and vulcanizing the article into a compact unitary mass.

6. As an article of manufacture, a composite body of rubber and fiber distributed therethrough, the distribution of the fiber being such as to be a maximum in one portion of the body, whereby said portion will have a high compressibility and a low resiliency, and a minimum in another portion of the body, whereby said other portion of the body will have a high resiliency and a low compressibility, and the distribution of fiber in intermediate portions of the body will range gradually from a maximum to a minimum, whereby the body, taken as a whole, will be free from zones of shear stress concentration, partake of the properties of rubber in one region, and of the properties of a rigid body in another portion.

7. As an article of manufacture, a shaped and vulcanized composite rubber body having a load receiving portion and a base portion, the base portion being composed of a quantity of compressible material containing a limited quantity of rubber serving as a binder, said base portion having the properties of high compressibility and low extensibility as compared to the same properties in the remainder of the body, the load receiving portion being composed essentially of rubber, said load receiving portion having the properties of low compressibility and high extensibility as compared to the base portion of the body, the remaining and intermediate portions of the body being composed in part of rubber imparting to said portions intermediate properties of compressibility and extensibility and in part of compressible material modifying the properties of the rubber in the intermediate portions, the variation in the properties of the body throughout its extent being so gradual that the various portions of the body merge into adjacent portions, thereby effecting a concurrent gradation of the properties of the body.

8. In the manufacture of composite articles containing rubber, the process which comprises forming a base portion for the article from a mass of divided compressible and slightly inextensible material, admixing with the material fluid latex in an amount sufficient to serve as a binder but less than that required to impart the properties of rubber to the base portion, superimposing on the base portion a quantity of latex admixed with a limited amount of compressible material and also with particles of vulcanized rubber, superimposing upon this layer another layer containing substantially all rubber, incorporating throughout the body so formed a quantity of vulcanizing agents, including in the latex a quantity of a protective colloid, drying the body to extract water and to convert the rubber in the fluid latex to a gel, compacting the body to weld the gel rubber into a continuous mass enclosing the incompressible material and the old rubber, and vulcanizing the body to a desired shape.

9. As an article of manufacture, a composite body as defined in claim 2, wherein the bonding rubber is derived in situ from fluid latex.

10. As an article of manufacture, a composite body as defined in claim 3, wherein the bonding rubber is derived in situ from fluid latex.

In testimony whereof, I have hereunto affixed my signature.

WILLIAM BURTON WESCOTT.